Patented Sept. 29, 1953

2,653,936

UNITED STATES PATENT OFFICE 2,653,936

PREPARATION OF AMMELINE

Alexander F. MacLean, Corpus Christi, Tex., assignor to American Cyanamid Company, New York, N. Y., a corporation of Maine No Drawing. Application July 29, 1950,
Serial No. 176,774

5 Claims. (Cl. 260—249.8)

The present invention relates to the preparation of ammeline by the catalyzed reaction of dicyandiamide and urea.

When dicyandiamide and urea are fused in the absence of a catalyst to product ammeline in accordance with the method of Smolka and Friedreich, Monatsh., vol. 9, page 701, the yield is very poor, about 14%.

It is an object of the present invention to conduct the dicyandiamide-urea reaction in the presence of a basic catalyst whereby the yield of ammeline is greatly improved. It is a further object of the invention to carry out the reaction in a solvent. Additional objects will be apparent from the discussion hereinafter.

It is believed that the reaction of dicyandiamide with urea to form ammeline proceeds according to the following equation:

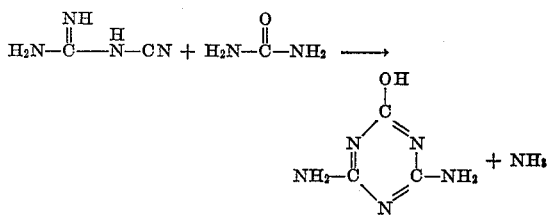

The following examples illustrate without limiting the invention.

Example 1

84 g. of dicyandiamide, 180 g. of urea, and 21 g. of potassium cyanate catalyst were fused in a beaker at 150° C. with stirring. The reaction was gently exothermic and ammonia was evolved. The product became thick as ammeline formed. After 15 minutes the reaction mass was cooled somewhat by adding 150 cc. of water to the molten mixture, and ammeline was filtered from the hot slurry, washed with water and dried. The yield was 62 g., 49%.

Various proportions of urea and dicyandiamide can be used, for example ratios as high as 10 to 1 or 1 to 10 respectively are suitable but it will be evident that the most economic ratio is approximately a 1 to 1 mole ratio. If ratios other than a 1 to 1 mole ratio are employed a greater excess of one of the reactants remains which must be separated.

The temperature of the reaction may also vary, the preferred range being 125 to 175° C.

The amount of catalyst is not critical and considerable quantities thereof can be used if desired. For economic operation of the process, however, it is preferred that the catalyst not exceed about 1 mole per 4 moles of dicyandiamide. A good working range is about 0.1 mole of catalyst per mole of dicyandiamide. However, much smaller amounts of catalyst can be used with beneficial results, including quantities as low as 0.01 mole of catalyst per mole of dicyandiamide, and even lower.

In its preferred embodiment the invention contemplates the use of a solvent for the reaction, such as disclosed in Example 2 following.

Example 2

| | | |
|---|---|---|
| Dicyandiamide | 420 g. | (5.0 moles) |
| Urea | 270 g. | (4.5 moles) |
| Butylcellosolve (glycol monobutyl ether). | 805 g. | |
| Potassium cyanate | 30 g. | (0.37 mole) |

The above materials were placed in a 3-l. 3-necked flask equipped with a mechanical stirrer, condenser, and thermometer and heated to 155° C.

The reactants dissolved as the mixture warmed up, but at no time was the solution transparent. During the course of the reaction a white, water-soluble sublimate coated the inside of the condenser. As the insoluble ammeline gradually formed the mixture became a thick slurry which after five hours of heating was filtered from the solvent.

The filter cake was slurried in 3-4 l. of 60° C. water and refiltered. The filter cake was dried in an electric oven (100–110° C.) Yields of total product were 94–95%, purity in terms of ammeline over 90%, and recovery of solvent over 80%.

Example 3

Strongly alkaline organic catalysts such as ethanolamine and the like, can also be used, with good results, as follows.

A mixture of 420 g. (5.0 moles) of dicyandiamide, 270 g. (4.5 moles) of urea, and 23 g. (0.37 mole) of ethanolamine in 805 g. of butyl cellosolve was heated for 5 hours at 155° C. The product was poured into 4 liters of water and the insolubles were filtered off. These insolubles upon drying weighed 305 g. and analyzed 85% ammeline and 15% ammelide by ultraviolet. The yield was 54%.

Additional catalysts suitable for the reaction are potassium carbonate, sodium carbonate, the alkali metal hydroxides, the alkali metal acetates, and other soluble strongly alkaline catalysts. Additional solvents that are suitable are Ethylcellosolve (glycol monoethyl ether), glycol and ammonia-methanol mixtures. The preferred catalyst-solvent combination is, however, potassium cyanate and butylcellosolve.

When carrying out the reaction in a solvent maximum yields are obtained when the reaction time is about 5 to 6 hours at 155° C.

However, the reaction time is not critical, for when the mixture is heated at 155° C. for only 1½ to 1¾ hours the yields are still in the range of 71 to 82%, using a Butylcellosolve solvent and a potassium cyanate catalyst.

While the invention has been described with particular reference to specific embodiments, it is to be understood that it is not to be limited thereto but is to be construed broadly and restricted solely by the scope of the appended claims.

I claim:

1. In the method of preparing ammeline by heating dicyandiamide with urea at substantially atmospheric pressure, the improvement comprising conducting the reaction in the presence of a strong alkali.

2. The method according to claim 1 in which the strong alkali is a member of the group consisting of the alkali cyanates, carbonates, hydroxides, and acetates.

3. The method according to claim 2 in which the strong alkali is potassium cyanate.

4. The method according to claim 3 in which the reaction is conducted in a solvent.

5. The method according to claim 4 in which the solvent is glycol monobutyl ether.

ALEXANDER F. MacLEAN.

References Cited in the file of this patent

UNITED STATES PATENTS

| Number | Name | Date |
|---|---|---|
| 2,467,712 | Walter | Apr. 19, 1949 |
| 2,572,587 | Beckman | Oct. 23, 1951 |

OTHER REFERENCES

Beilstein, vol. 26, 4 ed., 243–245.